United States Patent [19]
Funaki et al.

[11] Patent Number: 5,374,462
[45] Date of Patent: Dec. 20, 1994

[54] MAGNETIC RECORDING MEDIUM

[75] Inventors: Keisuke Funaki, Ichihara; Yuichi Ohki, Himeji, both of Japan

[73] Assignee: Idemitsu Kosan Co., Ltd., Tokyo, Japan

[21] Appl. No.: 651,262

[22] PCT Filed: Aug. 30, 1990

[86] PCT No.: PCT/JP90/01104
 § 371 Date: Apr. 4, 1991
 § 102(e) Date: Apr. 4, 1991

[87] PCT Pub. No.: WO91/03810
 PCT Pub. Date: Mar. 21, 1991

[30] Foreign Application Priority Data

| Aug. 31, 1989 | [JP] | Japan | 1-223184 |
| Aug. 31, 1989 | [JP] | Japan | 1-223185 |
| Sep. 4, 1989 | [JP] | Japan | 1-227560 |
| Sep. 8, 1989 | [JP] | Japan | 1-231510 |
| Sep. 22, 1989 | [JP] | Japan | 1-245225 |

[51] Int. Cl.$^5$ ............................ B32B 3/02; G11B 5/66
[52] U.S. Cl. ........................................ 428/64; 428/65; 428/141; 428/516; 428/694 ST; 428/694 SL; 428/694 SG; 428/900
[58] Field of Search ................ 428/694, 900, 516, 65, 428/64, 694 ST, 694 SL, 694 SG, 141

[56] References Cited

U.S. PATENT DOCUMENTS

| 4,318,957 | 3/1982 | Videc | 428/295 |
| 4,640,863 | 2/1987 | Matsumoto et al. | 428/323 |
| 4,680,211 | 7/1987 | Evans et al. | 428/65 |
| 4,680,353 | 7/1987 | Ishihara et al. | 526/160 |
| 5,004,649 | 4/1991 | Yamasaki et al. | 428/461 |

FOREIGN PATENT DOCUMENTS

| 0210808 | 2/1987 | European Pat. Off. . |
| 0304153 | 2/1989 | European Pat. Off. . |
| 0337316 | 10/1989 | European Pat. Off. . |

*Primary Examiner*—Paul J. Thibodeau
*Assistant Examiner*—L. Kihiman
*Attorney, Agent, or Firm*—Oblon, Spivak, McClelland, Maier & Neustadt

[57] ABSTRACT

A magnetic recording medium having a magnetic layer on at least one side of a base film which is a stretched film of styrene polymer having a high degree of syndiotactic configuration or a composition thereof or a laminate film containing the stretched film, wherein linear expansion coefficient is not more than $5 \times 10^{-5}$/° C. and static friction coefficient is not less than 0.3 and not more than 1.0 is disclosed.

The magnetic recording medium has good sliding properties, smoothness, heat resistance and moisture resistance, is excellent in dimensional stability to temperature and moisture, and has good coersive force, thus can be highly densified.

5 Claims, No Drawings

MAGNETIC RECORDING MEDIUM

FIELD OF THE INVENTION

The present invention relates to magnetic recording medium, magnetic tape, magnetic disk and magnetic card, more specifically, to magnetic recording medium which is excellent in physical properties such as sliding properties, smoothness, heat resistance, moisture resistance, dimensional stability, electrical insulating properties and further capable of densification, and magnetic tape and magnetic disk, and magnetic card which have these properties and high whiteness degree.

BACKGROUND OF THE INVENTION

Hitherto, polyethylene terephthalate (PET) film substrate coated with magnetic layer has been widely used as a magnetic recording medium. However, PET film is inferior in water resistance, and sometimes it can not be used because it may be hydrolyzed at high temperature under high humidity. Glass transition temperature of PET is 60° to 80° C. Elastic modulus may be sharply decreased at a temperature higher than the above range, and elongation or the like may readily occur. Accordingly, reliability is not always sufficient. Magnetic tape using such PET film as a base film has problem, that is, bad reproduction due to elongation of the base film at high temperature, for example, in a car.

As a base film for magnetic disk such as floppy disk demand for which has been increasing, the above PET film has been used. Recently, as miniaturization and densification of floppy disk, further improvement of physical properties such as heat resistance, moisture resistance, dimensional stability and the like has been required. However, a magnetic disk using the above PET film as a base material has problems in dimensional change with change of moisture, anisotropism of thermal expansion coefficient in face, eternal shrinkage when left at high temperature under high moisture over a long period of time. Polyphenylene sulfide (PPS) film used as a base film for this magnetic disk may overcome the above problems, but it is too expensive for practical use. Satisfactory base materials for magnetic disk have not been proposed, yet.

On the other hand, magnetic recording medium has been further densified, and demand for its reliability has been increasing. One of the means for densification is a method wherein a magnetic layer is laminated on a base film by a vapor deposition method. This method, however, has problems, for example, insufficient heat resistance, separation of oligomer when PET film is used as a base film.

Further, demand for magnetic card has been increasing. As base films for magnetic cards, polyvinyl chloride film and polyester film have been known. However, base film of polyvinyl chloride has low heat resistance and less resilient. Base film of polyester has problems in practical application, for example, insufficient whiteness, too much gloss. Base films for magnetic cards which are excellent in heat resistance, chemical resistance, electrical insulating properties, dimensional stability and the like and have sufficient whiteness are required.

As described above, the magnetic recording medium obtained from the conventional base film have various problems for practical application, for example, insufficient sliding properties, smoothness, heat resistance, moisture resistance, dimensional stability and the like.

DISCLOSURE OF THE INVENTION

The present inventors have studied to develop a magnetic recording medium which overcomes the above problems. Previously, the group of the present inventors have succeeded to develop a styrene polymer having a high degree of syndiotactic configuration. This polymer, which is superior to PET in heat resistance, water resistance, dimensional stability and the like, is a polymer with less oligomer and expected to be widely applied. The present inventors have studied intensively to develop a highly-densified magnetic recording medium with high reliability even under severe conditions such as high temperature, high humidity using this styrene polymer having a high degree of syndiotactic configuration.

The object of the present invention is to provide a magnetic recording medium excellent in physical properties such as heat resistance, moisture resistance, smoothness, dimensional stability, and high density magnetic recording medium which has the above properties and is further excellent in, for example, coercive force.

Another object of the present invention is to provide heat resistant magnetic tape excellent in heat resistance, moisture resistance, smoothness, dimensional stability, mechanical strength, and a magnetic disk which is especially excellent in heat resistance, moisture resistance, smoothness, dimensional stability and the like.

Still another object of the present invention is to provide a magnetic card which is excellent in, for example, heat resistance, moisture resistance, smoothness, mechanical strength, and has high whiteness.

As a result of study from such point of view, it has been found that stretched film of the above styrene polymer or a composition thereof, or laminated film containing said stretched film, which has a magnetic layer in a base film, the physical properties of the film, for example, linear expansion coefficient, static friction coefficient, surface roughness, elastic modulus, heat deformation temperature being in a certain range, may provide magnetic recording medium, magnetic tape, magnetic disk which meet the above object.

Further, when a magnetic card which is required for printing is prepared from a stretched film comprising styrene polymer having a high degree of syndiotactic configuration, the product is excellent in, for example, heat resistance, chemical resistance, electrical insulating properties, but is disadvantageous because gloss is too high and whiteness is insufficient. As a result of a further study, it has been found that a magnetic card with sufficient whiteness can be obtained without deterioration of the intrinsic properties by compounding a white inorganic filler in a specific range in the styrene polymer having a high degree of syndiotactic configuration.

The present invention has been attained based on such findings.

That is, the present invention provides a magnetic recording medium which has a magnetic layer on at least one side of a base film which is a stretched film of a styrene polymer having a high degree of syndiotactic configuration or a composition thereof, or a laminated film containing said stretched film, and has linear expansion coefficient of not more than $5 \times 10^{-5}$ /° C. and static friction coefficient of 0.3 to 1.0. The present invention provides a heat resistant magnetic tape comprising a base film which is a stretched film of styrene polymer having a high degree of syndiotactic configuration or a composition thereof or a laminated film containing said stretched film, wherein elastic moduli at room temperature in machine direction (MD) and in transverse direction (TD) are at least 30,000 kg/cm$^2$, the ratio (MD/TD) is at least 0.8, elastic modulus at 90° C. in MD is at least 10,000 kg/cm$^2$, linear expansion coefficient at 0° to 90° C. is not more than $5 \times 10^{-5}$ /° C., and surface roughness Ra, is 0.001 to 0.3, and a magnetic layer provided at least on one side thereof. Further, the present invention provides a magnetic disk comprising a base film which is a stretched film of a styrene polymer having a high degree of syndiotactic configuration or a composition thereof or a laminated film containing said stretched film, wherein linear expansion coefficient in MD ($\alpha_{MD}$) and in TD ($\alpha_{TD}$) is not more than $5 \times 10^{-5}$ /° C., the ratio ($\alpha_{MD}/\alpha_{TD}$) is 0.3 to 3, surface roughness Ra is 0.001 to 0.03 μm, and thickness is 20 to 200 μm, and a magnetic layer provided at least one side thereof. Moreover, the present invention provides a magnetic card having a magnetic layer on at least one side of a base film which is a film comprising 40 to 99% by weight of a film of a styrene polymer having a high degree of syndiotactic configuration or a composition thereof or a laminated film containing said film wherein linear expansion coefficient is not more than $7 \times 10^{-5}$ /° C., whiteness is not less than 75, thickness is 50 to 1,000 μm.

BEST MODE TO CONDUCT THE INVENTION

In the present invention, as a base film of a magnetic recording medium, a stretched film which comprises a monolayer film comprising the above stretched film of the styrene polymer having a high degree of syndiotactic configuration or a laminate film containing said stretched film is used. This base film has linear expansion coefficient of not more than $5 \times 10^{-5}$ /° C., preferably not more than $4 \times 10^{-5}$ /° C., and static friction coefficient, μs, of 0.3 to 1.0, preferably 0.3 to 0.9. This static friction coefficient, μs, determines the surface condition of the base film. Especially, static friction coefficient μs of the opposite side to the side, on which magnetic layer is formed, of the base film is desirably in the above range.

Surface roughness Ra of the surface of this base film is not particularly limited, but surface roughness Ra of at least one side thereof is preferably 0.001 to 0.05 μm, most preferably, 0.001 to 0.04 μm. For production of high densified magnetic recording medium, surface roughness Ra is preferably 0.001 to 0.03, particularly, 0.005 to 0.02 μm. Especially, surface roughness Ra of the base film on the magnetic layer-formed side is desirably in the above range.

When a magnetic layer is, for example, vapor deposited for densification of the aforementioned base film, the film having heat deformation temperature of not less than 230° C., particularly not less than 235° C. is the most preferable.

Moisture expansion coefficient of the above base film is not particularly limited, but preferably not more than $5 \times 10^{-5}$ /% RH.

As the base film for the magnetic tape of the present invention, a monolayer film consisting of the aforementioned stretched film or a laminate film containing said stretched film is used. The physical properties of this base film may be as follows: elastic modulus at room temperature (about 0° C. to 40° C.) in MD and TD is not less than 30,000 kg/cm$^2$, preferably not less than 33,000 kg/cm$^2$, the ratio of elastic modulus in MD to elastic modulus in TD (MD/TD) is not less than 0.8, preferably, 0.8 to 6, and elastic modulus in MD at 90° C. is not less than 10,000 kg/cm$^2$, preferably, not less than 15,000 kg/cm$^2$, linear expansion coefficient at 0° to 90° C. is not more than $5 \times 10^{-5}$ /° C., preferably, not more than $4 \times 10^{-5}$ /° C., and surface roughness Ra is 0.001 to 0.03, preferably, 0.003 to 0.03.

When elastic modulus in MD at room temperature is less than 30,000 kg/cm$^2$, the tape may be stretched with a little load on running and good reproduction may not be obtained. When elastic modulus in TD at room temperature is less than 30,000 kg/cm$^2$, the tape may readily folded, sometimes resulting in bad reproduction. When the ratio of elastic modulus in MD to that in TD, i.e., MD/TD is less than 0.8, the tape may be readily torn off.

When elastic modulus in MD at 90° C. is less than 10,000 kg/cm$^2$, the resulting tape can not be used at the high temperature, i.e. about 90° C. When linear expansion coefficient is more than $5 \times 10^{-5}$/° C., the resulting tape can not be used at the high temperature, i.e. about 90° C. When surface roughness Ra is outside of the range of 0.001 to 0.3, good running conditions as magnetic tape may not be obtained.

A monolayer film comprising the aforementioned stretched film or a laminate film containing said stretched film may be used as a base film of the magnetic disk of the present invention. The physical properties of this base film are as follows: Linear expansion coefficient in MD ($\alpha_{MD}$) and that in TD ($\alpha_{TD}$) are not more than $5 \times 10^{-5}$ /° C., preferably, not more than $4 \times 10^{-5}$ /° C., and the ratio thereof ($\alpha_{MD}/\alpha_{TD}$) is 0.3 to 3, preferably, 0.5 to 2, and surface roughness is 0.001 to 0.03 μm, preferably, 0.005 to 0.03 μm, and thickness is 20 to 200 μm, preferably, 50 to 150 μm.

The film with $\alpha_{MD}$ or $\alpha_{TD}$ over $5 \times 10^{-5}$ /° C. is not practical because it is deficient in dimensional stability. When the film with $\alpha_{MD}/\alpha_{TD}$ below 0.3 or over 3 is used as a magnetic disk, the disk may have isotropic dimensional stability in the surface upon environmental change, and good reproduction can not be obtained. Surface roughness Ra over 0.03 μm produces problems such as abrasion of the magnetic head. Ra below 0.001 μm produces problems in sliding properties, and tape with good running condition can not be readily obtained. Too thin base film provides magnetic disk deficient in resilience and self-supporting property which may be necessary for a magnetic disk, and the product can not be practically used, on the other hand too thick film is deficient in flexibility.

For production of a base film of such magnetic recording medium, magnetic tape and magnetic disk, various methods can be employed. For example, three methods shown below can be employed.

(1) A method wherein a composition comprising a styrene polymer having a high degree of syndiotactic configuration compounded with an inorganic filler, particularly, 0.001 to 1% by weight of an inorganic filler with an average particle diameter of 0.01 to 3 μm, is heat-melted, extruded, cooled and solidified, heated, stretched and heat-treated to form a stretched film, thereby providing a readily slidable monolayer film comprising this stretched film alone and whose both sides are smooth and roughened.

(2) A method wherein the composition used in the above (1) and a styrene polymer having a high degree of syndiotactic configuration, particularly, a styrene polymer of high purity with residual aluminum content of not more than 3,000 ppm, residual titanium content of not more than 10 ppm and residual styrene monomer content of not more than 7,000 ppm or a composition containing this styrene polymer as a main ingredient (containing no inorganic filler) are heat melted, co-extruded, cooled and solidified, heated, stretched to form a laminate of two or more stretched films. Accordingly, a readily slidable multilayer (laminate) film whose one side is extraordinary smooth and the other face is toughened may be obtained.

(3) A method wherein a styrene polymer having a high degree of syndiotactic configuration, particularly, a styrene polymer of high purity with residual aluminum content of not more than 3,000 ppm, residual titanium content of not more than 10 ppm and residual styrene monomer content of not more than 7,000 ppm, or a composition containing this styrene polymer as a main ingredient (containing no inorganic filler) is heat-melted, extruded, cooled and solidified, heated, stretched and heat-treated, while a layer comprising resin composition containing resin which can roughen the surface or an extremely fine inorganic filler is formed onto at least one face thereof by lamination, coating, vapor deposition or the like to give a readily slidable multilayer film wherein one face is extremely smooth and the other face is roughened. In this case, the layer comprising the above resin composition which may be stretched as needed can be used.

As the resin used for lamination, a styrene polymer having a high degree of syndiotactic configuration or various blend resins may be used. Among them, resins with high melting point or softening point are preferred. As for type, amount and particle diameter of the inorganic filler contained in the other resins, those described below is preferably used.

The method for lamination is not particularly limited, but, in addition to the co-extrusion method, a process for production of stretched film involving a method for dissolving and coating the other resin and resin composition thereof provides good productivity.

Particularly in tape, the above layer having a rough surface is used as a back coat layer, and a magnetic layer is mainly formed on the opposite side, i.e., extremely smooth surface.

Thus obtained stretched film is 2 to 500 $\mu$m thick with linear expansion coefficient of not more than $5 \times 10^{-5}$ /° C. and static friction coefficient $\mu s$ of 0.3 to 1.0. The surface roughness Ra of the both sides according to the method (1) is 0.005 to 0.05 $\mu$m, and according to the methods (2) and (3) the layer have both readily slidable rough surface and smooth surface, and surface roughness of said surfaces is 0.005 to 0.05 $\mu$m and 0.001 to 0.04 $\mu$m, respectively. Selecting conditions for stretching and additives and the like, a film with surface roughness of 0.001 to 0.03 $\mu$m, elastic modulus at room temperature in MD and TD of at least 30,000 kg/cm$^2$, the ratio (MD/TD) of at least 0.8, elastic modulus at 90° C. in MD of at least 10,000 kg/cm$^2$, linear expansion coefficient in MD ($\alpha_{MD}$) and in TD ($\alpha_{TD}$) of not more than $5 \times 10^{-5}$ /° C., and the ratio $\alpha_{MD}/\alpha_{TD}$ of 0.3 to 3 may be readily obtained. Generally, heat deformation temperature of the resulting stretched film is at least 230° C., and more preferably, moisture expansion coefficient is not more than $5 \times 10^{-5}$/% RH.

As for the thickness of the film, films of 2 to 20 $\mu$m thick, 20 to 150 $\mu$m thick and 100 to 500 $\mu$m thick are suitably used as a magnetic tape, a magnetic disk and a magnetic card, respectively.

Magnetic recording medium may be prepared using these films. Particularly in the production of magnetic disk, film whose surface adhesion is improved by corona treatment or the like may be used as needed. Further, an adhesive layer may be provided on the side on which a magnetic layer is to be provided.

Here, a styrene polymer having a high degree of syndiotactic configuration used as a raw material for the above film means a styrene polymer wherein stereochemical structure is a high degree of syndiotactic configuration, that is, the stereostructure in which phenyl groups or substituted phenyl groups as side chains are located alternately in opposite directions relative to the main chain consisting of carbon-carbon bonds. Tacticity is quantitatively determined by the nuclear magnetic resonance method ($^{13}$C-NMR method) using carbon isotope. The tacticity measured by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrene polymer having a high degree of syndiotactic configuration in the present invention means styrene polymer, poly(alkylstyrene), poly(halogenated styrene), poly(alkoxystyrene), poly(vinyl benzoate), hydrogenated polymers thereof and a mixture thereof, or copolymers containing these structural units each having such syndiotacticity that the proportion of racemic diad is at least 75%, preferably at least 85%, or proportions of racemic pentad is at least 30% and preferably at least 50%. The poly(alkylstyrene) includes poly(methylstyrene), poly(ethylstyrene), poly(propylstyrene), poly(butylstyrene), poly(phenylstyrene), poly(vinylnaphthalene), poly(vinylstyrene), poly(acenaphthylene); and the poly(halogenated styrene) includes poly(chlorostyrene), poly(bromostyrene) and poly(fluorostyrene). The poly(alkoxystyrene) includes poly(methoxystyrene), poly(ethoxystyrene). Of these, a particularly preferred styrene polymer includes polystyrene, poly(p-methylstyrene), poly(m-methylstyrene), poly(p-tert-butylstyrene), poly(p-chlorostyrene), poly(m-chlorostyrene), poly(p-fluorostyrene) and further a copolymer of styrene and p-methylstyrene (see Japanese Patent Application Laid-Open No. 187708/1987).

Comonomer of the styrene copolymer includes, in addition to the above-described monomer of styrene polymer, olefin monomer such as ethylene, propylene, butene, hexene, octene; diene monomer such as butadiene, isoprene; cyclic diene monomer or polar vinyl monomer such as methyl methacrylate, maleic anhydride, acrylonitrile.

Molecular weight of the styrene polymer is not particularly limited, but the styrene polymers having weight average molecular weight of 10,000 to 3,000,000, especially, 50,000 to 1,500,000 are most suitable. When weight average molecular weight is less than 10,000, the product may not be sufficiently stretched. Further, the range of molecular-weight distribution is not limited and various ranges can be used. The value, weight average molecular weight (Mw)/number average molecular weight (Mn) is preferably 1.5 to 8. The styrene polymer having a high degree of syndiotactic configuration is much superior in heat resistance to the conventional styrene polymer having an atactic configuration.

The styrene polymer having a high degree of syndiotactic configuration which constitutes the aforementioned stretched film (especially, a film having an extremely smooth surface) is as described above. Especially, the styrene polymer, wherein the residual aluminum content in the styrene polymer is not more than 3,000 ppm, the residual titanium content is not more than 10 ppm and the residual styrene monomer content is not more than 7,000 ppm, is preferred. Particularly, the styrene polymer wherein the residual aluminum content is not more than 1,000 ppm, the residual titanium content is not more than 7 ppm and the residual styrene monomer content is not more than 5,000 ppm is most preferable.

The methods for production of such styrene polymer of high purity include various ones as shown below. Firstly, for control of the residual aluminum content and the residual titanium content within the above range, (1) a method in which a highly active catalyst is used to produce a styrene polymer (see, Japanese Patent Application Laid-Open No. 294705/1989) or (2) a method which comprises deashing and washing, that is, a method wherein a styrene monomer is polymerized using a conventional organometallic compound of group IVA described in Japanese Patent Application laid-Open No. 187708/1987 and the like and alkylaluminoxane such as methylaluminoxane as the catalyst components, then the resulting styrene polymer having a syndiotactic configuration is deashed with a solution of acid or alkali in a suitable solvent, and washed with a suitable solvent.

As mentioned above, a styrene polymer having a syndiotactic configuration with less residual aluminum and residual titanium content can be obtained by the method (1) or (2). Further, the product is treated by the following method (3) or (4) to control the residual styrene monomer content below 7,000 ppm.

(3) A method wherein the above styrene polymer is dried under reduced pressure.

For drying under reduced pressure, it is efficient to set the drying temperature at the glass transition temperature of the polymer or higher.

(4) A method wherein the above styrene polymer is degassed by an extruder.

The above styrene polymer or the styrene polymer dried under reduced pressure by the method (3) is degassed by an extruder and simultaneously formed into a material for molding (pellet). An extruder used in this step is preferably equipped with a vent. Either a uniaxial or biaxial extruder may be used.

Such treatment provides a styrene polymer of high purity which contains less residual aluminum, residual titanium and residual styrene monomer and has a syndiotactic configuration.

The component of the stretched film having a readily slidable rough surface is a composition wherein a styrene polymer having a high degree of syndiotactic configuration is compounded with an inorganic filler, particularly the above styrene polymer containing 0.001 to 1% by weight of inorganic filler with an average particle diameter of 0.01 to 3 $\mu$m This composition may be prepared by compounding the styrene polymer (which is not necessarily of high purity as described above but obtained according to the method described in Japanese Patent Application Laid-Open No. 187708/1987) with an inorganic filler or as a deposit in the polymer. In this case, the inorganic filler means oxide, hydroxide, sulfide, nitride, halide, carbonate, acetate, phosphate, phosphite, organic carboxylate, silicate, titanate or borate of the group IA, IIA, IVA, VIA, VIIAT VIII, IB, IIB, IIIB or IVB element, and hydrate compound thereof, complex compound and natural mineral particles containing them as major ingredient.

For example, group IA element compound such as lithium fluoride, borax (hydrate salt of sodium borate); group IIA element compound such as magnesium carbonate, magnesium phosphate, magnesium oxide (magnesia), magnesium chloride, magnesium acetate, magnesium fluoride, magnesium titanate, magnesium silicate, hydrate salt of magnesium silicate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate, barium phosphite; group IVA element compound such as titanium dioxide (titania), titanium monooxide, titanium nitride, zirconium dioxide (zirconia), zirconium monooxide; group VIA element compound such as molybdenum dioxide, molybdenum trioxide, molybdenum sulfide; group VIIA element compound such as manganese chloride, manganese acetate; group VIII element compound such as cobalt chloride, cobalt acetate: group IB element compound such as copper iodide; group IIB element compound such as zinc oxide, zinc acetate; group IIIB element compound such as aluminum oxide (alumina), aluminum hydroxide, aluminum fluoride, aluminosilicate (alumina silicate, kaolin, kaolinite); group IVB element compound such as silicon oxide (silica, silica gel), plumbago, carbon, graphite, glass; particulate natural mineral such as carnallite, kainite, isinglass (mica, phlogopite) and pyrolusite.

The average particle diameter of the inorganic filler to be used in the present invention is not particularly limited, but preferably, 0.01 to 3 $\mu$m, more preferably, 0.01 to 1 $\mu$m. The content in the molded product is 0.001 to 1% by weight, preferably, 0.001 to 0.6% by weight. When the average particle diameter is less than 0.01 $\mu$m, it may be difficult to disperse particles because of secondary agglomeration of particles. When the average particle diameter is more than 3 $\mu$m, smoothness may be deteriorated. If the content of the inorganic filler in the composition is less than 0.001% by weight, the effect of improvement of sliding property may be insufficient, and if the content is more than 1% by weight, stretching of thin film may become difficult.

The aforementioned inorganic filler is a component which is effective to attain the object of the present invention. But it may contain other type fine particle or a fine particle with different particle diameter, or inorganic filler or the like so long as the object of the present invention is not hindered.

The inorganic filler is contained in the final molded product (film) and the method for compounding is not limited. For example, it is added or obtained as a deposit in the optional step during polymerization, or added in the optional step during melt extrusion.

Particularly, in the present invention, a method wherein the above inorganic filler as slurry is added in the optional step during polymerization process is preferable to inhibit secondary agglomeration of particles.

For effective dispersion of these fillers, dispersant, surfactant or the like may be used.

Considering moldability, mechanical properties, surface properties and the like, antioxidant, antistatic agent, flame retardant, inorganic filler, or other resin may be optionally compounded with the raw material used in the stretched film which constitutes the base film of the present invention, so long as the object of the present invention is not hindered.

The other resin includes various kinds, for example, styrene polymer having an atactic configuration, styrene polymer having an isotactic configuration, polyphenylene ether and the like. Such resins may be readily compatibilized with the above styrene polymer having a syndiotactic configuration and effective to control crystallization when pre-molded product for stretching is prepared, thereby providing a film with enhanced stretching properties and excellent mechanical properties, whose stretching conditions may be readily controlled. Among them, when styrene polymer having an atactic and/or isotactic configuration is compounded, it is preferably composed of the same monomers as those of the styrene polymer having a syndiotactic configuration. The content of the compatible resin component is 70 to 1% by weight, preferably, 50 to 2% by weight. When the content of the compatible resin component exceeds 70% by weight, heat resistance, which is an advantage of the styrene polymer having a syndiotactic configuration, may be undesirably spoiled. The other noncompatible resins which can be added to the polymer of the present invention include a polyolefin such as polyethylene, polypropylene, polybutene, polypentene; a polyester such as polyethylene terephthalate, polybutylene terephthalate, polyethylene naphthalate; a polyamide such as nylon-6, nylon-6,6; a polythioether such as polyphenylene sulfide, a polycarbonate, a polyarylate, a polysulfone, a polyether ether ketone, a polyethersulfone, a polyimide, a halogenated vinyl polymer such as Teflon, an acrylic polymer such as polymethyl methacrylate, a polyvinyl alcohol, and all but the aforementioned compatible resins. There are also cross linked resins containing the aforementioned compatible resins. When the styrene polymer of the present invention having a syndiotactic configuration contains a small amount of the resin, such resin, which is incompatible with the above styrene polymer, can be dispersed like islands in the styrene polymer having a syndiotactic configuration. Accordingly, it is effective to provide proper gloss and to improve sliding property of the surface after stretching. The content of these non-compatible resin components is 50 to 2% by weight for the purpose of providing gloss, and 0.001 to 5% by weight for the purpose of controlling the surface properties. When the temperature at which the product is used is high, non-compatible resin with considerable heat resistance is preferably used.

Base film of the magnetic recording medium, magnetic tape, magnetic disk of the present invention can be formed according to the aforementioned methods. The operations from heat melting to heat treatment (annealing) will be explained in detail.

Firstly, the above material for molding is usually extruded (or coextruded) to give a pre-molded product for stretching (film, sheet or tube). In this molding, the aforementioned heat-melted material for molding is generally molding into a desired form by an extruder. Alternatively, the material for molding may be molded without heat melting while it is softened. An extruder used in this case may be either a uniaxial extruder or a biaxial extruder, with or without vent. A uniaxial tandem type is preferred. By using an extruder with a suitable mesh, impurities and contaminants can be removed. Preferably, for production of a stretched film having a smooth surface, the mesh is preferably at least 100 mesh, most preferably, at least 400 mesh. Considering pressure resistance and strength of the mesh itself, mesh with gauge lower than the above may be placed before or behind thereof. As for the shape of the mesh, for example, plane or cylinder mesh may be properly selected and used.

The extrusion conditions are not particularly limited and properly selected depending on the various circumstances. Preferably, the temperature is selected in the range from melting point to the temperature 50° C. higher than decomposition temperature of the material for molding, and shear stress is not more than $5 \times 10^6$ dyne/cm². The die used is a T-die, a ring die or the like.

After the above extrusion, the resulting pre-molded product is cooled and solidified. As a refrigerant used in this step, for example, gas, liquid, metal roller and the like may be used. When a metal roller is used, a method using air knife, air chamber, touch roll, electrostatic application and the like Is effective to prevent uneven thickness and surge.

The temperature of cool solidification is generally 0° C. to 30° C. higher than glass transition temperature of the premolded product for stretching, preferably from 20° C. to glass transition temperature. The cooling rate is properly selected within the range from 200° to 3 ° C./sec.

In the present invention, the cooled and solidified pre-molded product is preferably uni- or bi-axially stretched. For biaxial stretching, transverse direction (TD) stretching and machine direction (MD) stretching may be simultaneously conducted, or successively conducted in suitable order. Alternatively, stretching may be conducted in one step, or in multiple steps.

Methods for stretching include various methods such as a method using a tenter, a method wherein the product is stretched between rollers, a method by bubbling using a pressure of a gas, a method by rolling and the like. These methods may be applied singly or in combination. Especially, a method comprising MD stretching between rollers and subsequent TD stretching by a tenter, optionally followed by re-stretching, is preferable to reduce surface roughness, Ra. In the successive stretching, the absolute value of birefringence $|\Delta n|$ of MD stretching during the primary step should be $3 \times 10^3$ to $70 \times 10^{-3}$. Subsequently, TD stretching, or in some case re-stretching is conducted, and after heat treatment, the absolute value of birefringence $|\Delta n|$ of the resulting film is kept below $4 \times 10^{-3}$ to form a film with well-balanced strength and linear expansion coefficient.

The temperature for stretching is generally set between glass transition temperature of the pre-molded product and melting point of the pre-molded product. The stretching rate is generally $1 \times 10$ to $1 \times 10^5 \%$/min., preferably, $1 \times 10^3$ to $1 \times 10^5 \%$/min. The stretching ratio is preferably at least 2.5 (MD) and at least 2.0 (TD). Aerial stretching ratio is preferably at least 6 to improve elastic modulus and the like. Too low aerial stretching ratio disadvantageously results in low dimensional stability.

It is preferable to further conduct heat treatment (annealing or heat settling) for the stretched film obtained by stretching under the aforementioned conditions when dimensional stability, heat resistance, strength balance of the surface of the film at high temperature are further required. Heat treatment may be conducted by the usual method. It can be conducted by maintaining the stretched film in the temperature range from glass transition temperature to melting point of the film, preferably, 100° C. lower than melting point to a little lower than melting point for 0.5 to 120 seconds under a state of tension, a relaxed state or a state of controlling shrinkage. Such heat setting may be conducted twice or more changing the conditions within the above range. If the temperature during the heat setting is too low, sufficient heat resistance may not be undesirably obtained during the formation of a layer of magnetic substance by vapor deposition. The heat setting may be conducted in an atmosphere of inert gas such as argon gas, nitrogen gas or the like.

Without the aforementioned heat setting, linear expansion coefficient at 0° to 90° C. may become more than $5 \times 10^{-3}$, and particularly deformation around glass transition temperature may become greater.

Thus obtained base film for magnetic recording medium, magnetic tape or magnetic disk of the present invention has linear expansion coefficient, static friction coefficient $\mu s$, elastic modulus, surface roughness Ra and heat deformation temperature within the above range. This base film may be formed into various forms such as tape, disk, card.

As a base film for the magnetic card of the present invention, a monolayer film comprising a composition which is obtained by blending 40 to 99% by weight of the aforementioned styrene polymer having a high degree of syndiotactic configuration and 60 to 1% by weight of a white inorganic filler, or a laminate film containing said film may be used. The base film has linear expansion coefficient of not more than $7 \times 10^{-5}/°$ C., whiteness of not less than 75, preferably not less than 80, and thickness of 50 to 1,000 $\mu m$, preferably 75 to 800 $\mu m$. If linear expansion coefficient of the base film exceeds $7 \times 10^{-5}/°$ C., temperature change during reproduction of the record is undesirably remarkable. If whiteness falls below 75, clear characters and picture can not be obtained, that is, it is not preferable in practical application. If the film is thinner than 50 $\mu m$, strength, durability, maintenance may be insufficient. On the other hand, too thick film is not preferable because processability, handling properties, flexibility are reduced.

More preferably, heat shrinkage ratio of the above base film is not more than 2% at 200° C. to inhibit deformation during processing and usage.

Considering adhesion between the magnetic layer and the adhesive layer and the like, corona treatment and the like may be conducted onto the surface of the film.

The above base film can be obtained by a method wherein a composition obtained by adding a white inorganic filler to a styrene polymer having a high degree of syndiotactic configuration is formed into a film, or a method wherein said composition is formed into film on the surface of the different film by lamination or coating, or a combination thereof. Most preferably, a composition of a styrene polymer having a syndiotactic configuration added with a white inorganic filler is biaxially stretched. For addition of such white inorganic filler, a method by adding at an optional step during polymerization, a method by blending after polymerization, a method by blending master batch or the like may be employed.

The composition used as a raw material for the base film of the magnetic card of the present invention comprises 40 to 99% by weight of styrene polymer having a high degree of syndiotactic configuration and 60 to 1% by weight of white inorganic filler. If the amount of the white inorganic filler to be compounded exceeds 60% by weight, the resulting magnetic card has high elastic modulus but is too brittle to be used. A composition with the amount of the filler over 60% by weight is difficult to be stretched and to improve toughness by stretching, and if it is less than 1% by weight, desirable whiteness for a magnetic card can not be shown.

The styrene polymer having a high degree of syndiotactic configuration is as described above.

As the white inorganic filler forming a composition, which forms a raw material of the base film, in combination with the above styrene polymer includes various kinds, preferably, a compound comprising at least one element selected from a group consisting of the group of IIa, IIb, IIIb, IVa, IVb, Vb, VIa, VIIa in a periodic table, for example, magnesium oxide, aluminum oxide, silicon oxide, titanium oxide, calcium carbonate, barium sulfate, magnesium carbonate, calcium silicate, or a mixture thereof. An average particle diameter of the white filler is not particularly limited, but preferably, 0.03 to 5 $\mu$. The amount to be added is as described above. Particularly, in the case of a monolayer film, 1 to 40% by weight is preferable, and 3 to 30% by weight is more preferable. In the case of laminate or coating, 5 to 60% by weight is preferable and 8 to 55% by weight is more preferable. If the styrene polymer is whitened during stretching like p-methylstyrene homopolymer to give a white film, the amount to be added may be small, that is, 1 to 20% by weight.

The resin components constituting the base film of the present invention, in principle, is the aforementioned styrene polymer having a syndiotactic configuration. Considering moldability, mechanical properties, surface properties and the like, other resin and the like may be optionally compounded within the range so long as the object of the present invention is not hindered. Such resin includes the same resins as those shown above. If incompatible resin is used as said other resin, the amount of white inorganic filler to be added may be considerably reduced.

In the present invention, stabilizer, antioxidant, lubricant, brightening agent, UV absorbent, matting agent, or other additives may be added to the above composition as needed.

In the process for forming the base film of the magnetic card of the present invention, the operations from heat melting to heat treatment (annealing) explained for the base film of the above magnetic recording medium may be conducted. After operation of annealing, addition of inorganic or organic filler into the film, lamination of toughened film, sand mat-treatment, coating mat treatment, embossing treatment or the like may be optionally conducted.

Thus obtained base film of the magnetic card of the present invention has linear expansion coefficient of not more than $7 \times 10^{-5}/°$ C., whiteness of not less than 80, thickness of 50 to 1,000 $\mu m$.

By forming at least one magnetic layer is formed onto thus obtained base film, the magnetic recording medium, magnetic tape, magnetic disk or magnetic card of the present invention can be prepared. Further, undercoating layer, back coating layer or topcoating layer may be formed. These layers may be totally or partly formed on both or either side of the base film.

The magnetic materials which is a raw material of the magnetic layer includes various materials, for example, Co, Co—O, Co—Cr, Co—V, Co—Ni, Co—P, Co—γ-Fe$_2$O$_3$, Co—Ni—P, Co—Ni—N, Co—Ni—W, Co—Ni—Pt, CoNi(Cr)/Cr, Fe, Fe—O, Fe—Ag, γFe$_2$O$_3$, Fe—Co, BaO·γFe$_2$O$_3$, Ni, CrO$_2$. Particularly, for production of densified magnetic recording medium, it is preferable to use a vertically magnetizable material such as Co, Co—O, Co—Cr, Co—V, Co—Ni, Co—P, Co—N—O, CO—Nt—P, Co—Ni—N, Co—Ni—W, Co-Ni(Cr)/Cr, BaO·γFe$_2$O$_3$ and the like.

A magnetic layer is formed on a base film using this magnetic material according to various methods such as coating, vapor deposition, sputtering, metal plating method or the like. The operation conditions and the like may be optionally selected according to the conventional methods. It is particularly preferable to form Co and BaO·γFe$_2$O$_3$ magnetic materials by vapor deposition or sputtering, and coating, respectively, from the viewpoint of formation of vertically magnetic layer.

Thickness of the magnetic layer is not particularly limited, but generally 0.01 to 10 μm, and particularly 0.5 to 10 μm in the case of coating, 0.01 to 1 μm in the case of vapor deposition and sputtering, and 0.1 to 5 μm in the case of metal plating.

The resin for binder used for coating includes, for example, vinyl copolymer resin such as vinyl chloride—vinyl acetate copolymer, vinyl-chloride—vinyl acetate partly saponified copolymer, vinyl chloride—vinylidene chloride copolymer, vinyl chloride—acrylonitrile, vinyl butyral, vinyl formal; fiber resin such as nitrocellulose, cellulose acetobutyrate; condensation polymerization resin such as saturated polyester, polyurethane polyamide, epoxy; synthetic rubber resin such as butadiene acrylonitrile copolymer; inorganic macromolecular resin such as phosphasene. A crosslinking agent such as isocyanate compound may be used.

The surface of thus obtained magnetic recording medium may be polished to prevent abrasion of a magnetic head.

The present invention is described in greater detail with reference to examples, comparative examples and reference examples.

REFERENCE EXAMPLE 1

(Preparation of a Material for Molding of Styrene Polymer containing inorganic filler (a polymer composition)

In a 500-milliliter glass vessel in which air had been replaced with argon, 17.8 g (71 mmol) of copper sulfate pentahydrate (CuSO$_4$·5H$_2$O), 200 ml of toluene and 24 ml (250 mmol) of trimethylaluminum were placed and reacted at 40° C. for 8 hours. And then, from the solution obtained by removing the solid, toluene was further distilled away under reduced pressure at room temperature to obtain 6.7 g of a catalytic product. The molecular weight of the product as determined by the freezing point depression method was 610. The aforementioned high magnetic component (i.e., −0.1 to −0.5 ppm) as observed by $^1$H-NMR was 43%.

Separately, 0.4 parts of dry method silica (Aerosil TT-600 (diameter of primary particle, 40 μm), manufactured by Degussa) was added to 100 parts of pure styrene monomer, and the resultant was mixed and stirred in a cylindrical container using T. K. Homomixer type L (manufacture by Tokushukika Kogyo) to prepare a styrene mixture. In this step, 0.05 parts by weight of calcium stearate was added.

In a 2-liter reactor, 1 L (L=liter) of styrene mixture obtained by the above method, 5 mmol of the catalytic product obtained by the above method as aluminum atom, 5 mmol of triisobutyl aluminum and 0.025 mmol of pentamethylcyclopentadienyltitanium trimethoxide were placed and polymerized at 90° C. for 5 hours. After completion of the reaction, a catalyst component of the product was decomposed with sodium hydroxide in methanol, then the resultant was washed with methanol repeatedly and dried to obtain 308 g of a polymer.

The weight average molecular weight of said polymer as determined by gel permeation chromatography at 135° C. using 1,2,4-trichlorobenzene as a solvent was 389,000, and weight average molecular weight/number average molecular weight was 2.64. The melting point and $^{13}$C-NMR measurements confirmed that said polymer was polystyrene having a syndiotactic configuration.

The polymer was dissolved in 1,2,4-trichlorobenzene at 130° C., then filtered and the silica content in the polymer was determined to 0.4% by weight. This solution was dropped onto a slide glass, and observed by a microscope. As the result, an average particle diameter of silica was 0.08 μm.

Further, the styrene polymer was dried in a vacuum at 150° C. for 2 hours. The resulting powder was extruded at 300° C. by a vented biaxial extruder equipped with a die containing several capillaries at the tip thereof, then cooled and cut to prepare pellet. The pellet was crystallized and dried in a hot air with stirring. The pellet had crystallinity of 35% and contained 700 ppm of styrene polymer.

(2) Preparation of styrene polymer without containing inorganic filler

In the same manner as that in the above (1) using styrene polymer without containing dry method silica, styrene polymer was prepared. The resulting polymer had weight average molecular weight of 417,000, weight average molecular weight/number average molecular weight of 2.54, and contained 75 ppm of Al and 2 ppm of Ti.

The styrene polymer was formed into pellet in the same manner as that in the above (1). Crystallinity and styrene monomer content of the pellet were 30% and 800 ppm, respectively.

REFERENCE EXAMPLE 2

(Production of Stretched Film of Styrene Polymer)

(1) The material for molding obtained in the same manner as that in Reference Example 1 (1) was used and melt extruded by a serial tandem type extruder with a T-die at the tip thereof at 330° C. Shear stress was $1.5 \times 10^5$ dyne/cm$^2$. The melt extruded sheet was contacted and cooled onto a metal cooling roller at 63° C. by electrostatic application to cool and solidify. In this step, the cooling rate was 55° C./sec in an average and 130 μm thick sheet for stretching was obtained. This sheet was stretched between rollers in MD (by three times) at 110° C. and stretching rate of 6,000%/min while circumferential speed of each roller was changed. Subsequently, the sheet was stretched by three times in TD at 120° C. and stretching rate of 6,000%/min using a tenter. Further, the sheet was re-stretched in MD by 1.5 times at 130° C.

and 2,000%/min while fixed in TD using a tenter. This film was fixed on a tenter, slightly relaxed and heat treated at 255° C. for 10 seconds.

Thickness of the film thus obtained was 12 μm. Linear expansion coefficient of the film was measured at 0° C. to 90° C. Moreover, surface roughness was measured according to JIS B-0601 (cut-off: 0.08 mm), and static friction coefficient was measured according to ASTM D-1984B. The properties of the resulting film are shown in the table.

(2) The operation of Reference Example 2 (1) was repeated, except that lip opening of the T-die and re-stretching ratio were increased by four times and 1.3 times, respectively. The properties of the resulting film are shown in the table.

(3) The operation of Reference Example 2 (1) was repeated, except that the crystallized pellet of styrene polymers of Reference Example 1 (1) and (2) were melt coextruded by an extruder with a T-die at the tip thereof at 330° C. The properties of the resulting film are shown in the table. In this case, pellet of styrene polymers of Reference Example 1 (2) and (1) were melt-extruded by a serial tandem type uniaxial extruder with a main extruder containing 50/150/400/150/50 mesh and a double extruder, respectively.

(4) The operation of Reference Example 2 (1) was repeated, except that pellet of styrene polymer of Reference Example 1 (2) was used and 50/150/400/150/50 mesh was placed in an extruder. The film was corona treated. Subsequently, a 0.5 wt % solution of styrene having a syndiotactic configuration—divinyl benzene copolymer obtained in Example 1 of Japanese Patent Application Laid-Open Publication No. 95113/1989 (wherein divinyl benzene unit, 9.4 mol %; ethyl benzene unit, 5.0 mol %; weight average molecular weight, 360,000) in chloroform was prepared. Dry method silica (Aerogil TT-600 (diameter of primary particle, 40 μm) manufactured by Degussa) (0.5 wt % based on styrene—divinyl benzene copolymer) was added to the above solution and homogeneously mixed in a cylindrical container using a homomixer type L (manufactured by Tokushukika Kogyo) to prepare a slurry solution. The slurry solution was coated on the above film using a bar coater, and dried at 250° C. for 10 seconds. The properties of the resulting film are shown in the table.

(5) The operation of Reference Example 2 (1) was repeated, except that heat treatment was not carried out.

(6) The operation of Reference Example 1 (1) was repeated, except that the inorganic filler used was silica having an average diameter of 4 μm (Silton AMT-40 manufactured by Mizusawa Kagaku Kogyo), and after a styrene polymer was prepared, the operation of Reference Example 2 (1) was repeated.

(7) In the same manner as that in Reference Example 2 (1), a film was prepared from a styrene polymer of Reference Example 1 (2).

EXAMPLE 1

Corona treatment was carried out on one side of the base film obtained in the same manner as that in Reference Example 2 (1). Subsequently, a target comprising 80 wt % Co and 20 wt % Ni was prepared, and a Co—Ni magnetic thin layer about 3,000 Å thick was formed using this target by RF sputter method.

The distance between the target and the film was 60 mm, plate voltage was 1.9 kV, plate current was 160 mA and argon pressure was $1.1 \times 10^{-2}$ mmHg.

The tape was carefully slitted to the same width as that of VHS video tape. The commercially available tape was dismantled, only tape was replaced and video cassette was prepared.

Sliding properties were estimated by static friction coefficient of this tape. Static friction coefficient of this tape was as good as that of the base film.

The prepared VHS video cassette tape was used for record and reproduction by a home video recorder. As an index of reliability, the conditions of record and reproduction were observed under room temperature conditions and under high temperature and high humidity conditions (85° C., 75% RH). Little difference was observed between both case. Both cases were good, presenting no disturbed picture. The results are shown in Table 1.

EXAMPLE 2

One side of the base film obtained in the same manner as that in Reference Example 2 (1) was corona treated and coated with magnetic coating composition. The constitution of this magnetic coating composition was as follows: γ-FeO$_3$ magnetic powder, 45 parts by weight; vinyl chloride—vinyl acetate copolymer (VAGH manufactured by U.C.C.), 17 parts by weight; acrylonitrile—butadiene copolymer (N 1432 J manufactured by Nippon Zeon), 3.5 parts by weight; polyisocyanate (coronate L manufactured by Nippon polyurethane), 1.5 parts by weight, methyl isobutyl ketone, 50 parts by weight; toluene, 50 parts by weight and carbon black, 4 parts by weight. Thickness of the magnetic layer after drying was 3 μm.

The procedure of Example 1 was repeated using this tape. The results are shown in Table 1.

EXAMPLE 3

After corona discharge treatment was carried out on the both sides of the base film obtained in the same manner as that in Reference Example 2 (2), magnetic layers were formed on the both sides in the same manner as that in Example 1. The both sides of this film were properly polished, then cut into the same size as the commercially available floppy (5-inch). Further, this disc was enclosed in a jacket of the commercially available floppy to prepare a floppy disc. Static friction coefficient of the film with a magnetic layer was determined in the same manner as that in Example 1. The conditions of SAVE and LOAD were observed using the prepared floppy and NEC PC-9801F under room temperature conditions and high temperature and high humidity conditions. Both case was good. The results are shown in Table 1.

EXAMPLE 4

The procedure of Example 1 was repeated, except that a magnetic layer was formed on the side of smooth surface of the film obtained in the same manner as that in Reference Example 2 (3). The results are shown in Table 1.

EXAMPLE 5

The procedure of Example 1 was repeated, except that a magnetic layer was formed on the side of smooth surface of the film obtained in the same manner as that in Reference Example 2 (4). The results are shown in Table 1.

COMPARATIVE EXAMPLE 1

The procedure of Example 1 was repeated, except that a magnetic layer was formed on one side of the film obtained in the same manner as that in Reference Example 2 (5). The results are shown in Table 1.

COMPARATIVE EXAMPLE 2

The procedure of Example 1 was repeated, except that a magnetic layer was formed on one side of the film obtained in the same manner as that in Reference Example 2 (6). The results are shown in Table 1.

COMPARATIVE EXAMPLE 3

The procedure of Example 1 was repeated, except that a magnetic layer was formed on one side of the film obtained in the same manner as that in Reference Example 2 (7). The results are shown in Table 1.

COMPARATIVE EXAMPLE 4

The procedure of example 1 was repeated, except that polyethylene terephthalate (PET) film (Tetron NS 12 μm, manufactured by Teijin) was used. The results are shown in Table 1.

ify. In this step, the cooling rate was 55° C./sec in an average and 130 μm thick sheet for stretching was obtained. This sheet was stretched between rollers in MD (by three times) at 110° C. and stretching rate of 6,000%/min while circumferential speed of each roller was changed. Subsequently, the sheet was stretched in TD at 120° C. and 6,000%/min by 3 times using a tenter. Further, the sheet was re-streched in MD at 130° C. and 2,000%/min by 1.5 times while fixed in TD using a tenter. This film was fixed on a tenter, slightly relaxed and heat treated at 255° C. for 10 seconds.

Thickness of the film thus obtained was 12 μm. Moisture expansion coefficient of the film was measured in the range from 20 to 80% RH. Expansion coefficient was measured at 0° C. to 90° C. Moreover, surface roughness was measured according to JIS B-0602 (cut-off: 0.08 mm), and static friction coefficient was measured according to ASTM D-1984B. Heat deformation temperature of this film was measured by thermal mechanical analysis (TMA). Heat deformation temperature means the temperature at which 2% change of the specimen length was observed. The properties of the resulting film are shown in Table 2.

(2) The procedure of Reference Example 3 (1) was repeated, except that lip opening of the T-die and re-stretching ratio were increased by 4 times and 1.3 times, respectively.

(3) The procedure of Reference Example 3 (1) was repeated, except that the crystallized pellet of styrene polymers of Reference Example 1 (1) and (2) were melt coextruded by an extruder with a T-die at the tip thereof at 330° C. The properties of the resulting film are shown in Table 2. In this case, pellet of styrene polymers of Reference Example 1 (2) and (1) were

TABLE 1

Stretched Film of Styrene Polymer

| No. | Production Process No. | Thickness (μm) | Linear Expansion Coefficient[1] (°C.$^{-1}$) | Surface Roughness Ra[2] (μm) | Static Friction Coefficient[3] |
|---|---|---|---|---|---|
| Example 1 | Ref. Ex. 2(1) | 12 | $3 \times 10^{-5}$ | 0.013 | 0.54 |
| Example 2 | Ref. Ex. 2(1) | 12 | $3 \times 10^{-5}$ | 0.013 | 0.54 |
| Example 3 | Ref. Ex. 2(2) | 75 | $4 \times 10^{-5}$ | 0.014 | 0.49 |
| Example 4 | Ref. Ex. 2(3) | 12 | $2 \times 10^{-5}$ | 0.008/0.014 | 0.58 |
| Example 5 | Ref. Ex. 2(4) | 12 | $2 \times 10^{-5}$ | 0.006/0.022 | 0.39 |
| Com. Ex. 1 | Ref. Ex. 2(5) | 12 | $1 \times 10^{-4}$ | 0.014 | 0.53 |
| Com. Ex. 2 | Ref. Ex. 2(6) | 12 | $3 \times 10^{-5}$ | 0.056 | 0.85 |
| Com. Ex. 3 | Ref. Ex. 2(7) | 12 | $2 \times 10^{-5}$ | 0.005 | 1.12 |
| Com. Ex. 4 | PET | 12 | $2 \times 10^{-5}$ | 0.02 | 0.45 |

Magnetic Recording Medium

| No. | Magnetic Material | Thickness of Magnetic Layer (μm) | Shape | Sliding Properties[4] | Recording and Reproduction[5] Room Temperature | Recording and Reproduction[5] High Temperature High Humidity |
|---|---|---|---|---|---|---|
| Example 1 | Co—Ni | 0.3 | Tape | Good | Good | Good |
| Example 2 | γ-Fe$_2$O$_3$ | 3 | Tape | Good | Good | Good |
| Example 3 | Co—Ni | 0.3 | Disk | Good | Good | Good |
| Example 4 | Co—Ni | 0.3 | Tape | Good | Good | Good |
| Example 5 | Co—Ni | 0.3 | Tape | Good | Good | Good |
| Com. Ex. 1 | Co—Ni | 0.3 | Tape | Good | Good | Bad |
| Com. Ex. 2 | CO—NI | 0.3 | Tape | Good | Bad | — |
| Com. Ex. 3 | Co—Ni | 0.3 | Tape | Bad | Bad | — |
| Com. Ex. 4 | Co—Ni | 0.3 | Tape | Good | Good | Bad |

[1] Measured at 0 to 90° C.
[2] According to JIS B-0601, cut-off: 0.08 mm
[3] According to ASTM D-1984
[4] Static friction coefficient: 0.03–1.0: good, ≧1: bad
[5] Image recorded on a tape was reproduced and observed.
Good: without disturbance of picture, Bad: with disturbance of picture (high temperature and high humidity means 85° C. and 75 RH)

REFERENCE EXAMPLE 3

(Production of Stretched Film of Styrene Polymer)

(1) The material for molding obtained in the same manner as that in Reference Example 1 (1) was used and melt extruded by a serial tandem type extruder with a T-die at the tip thereof at 330° C. Shear stress was $1.5 \times 10^5$ dyne/cm$^2$. The melt extruded sheet was contacted and cooled onto a metal cooling roller at 63° C. by electrostatic application to cool and solid-melt extruded by a serial tandem type uniaxial extruder with a main extruder containing 50/150/400/150/50 mesh and a double extruder, respectively.

(4) The procedure of Reference Example 3 (1) was repeated except that pellet of styrene polymer of Reference Example 1 (2) was used and 50/150/400/150/50 mesh was placed in an extruder. The film was corona treated. Subsequently, a 0.5 wt % solution of styrene having a syndiotactic configuration-divinyl benzene copolymer obtained in Example 1 of Japanese Patent Application Laid-Open Publication No. 95113/1989 (wherein divinyl benzene unit, 9.4 mol %; ethyl benzene unit, 5.0 mol %; weight average molecular weight, 360,000) in chloroform was prepared. Dry method silica (Aerogil TT-600 (diameter of primary particle, 40 μm) manufactured by Degussa) (0.5 wt % based on styrene—divinyl benzene copolymer) was added to the above solution and homogeneously mixed in a cylindrical container using a homomixer type L (manufactured by Tokushukika Kogyo) to prepare a slurry solution. The slurry solution was coated on the above film using a bar coater, and dried at 250° C. for 10 seconds. The properties of the resulting film are shown in Table 2.

(5) The procedure of Reference Example 3 (1) was repeated, except that heat treatment was not carried out.

(6) In the same manner as that in Reference Example 3 (1), a film was prepared from a styrene polymer of Reference Example 1 (2).

EXAMPLE 6

Corona treatment was carried out on one side of the base film obtained in the same manner as that in reference Example 3 (1). Subsequently, a 0.1 μm thick Co—Cr membrane (Cr: 20 wt %) was formed by a vacuum vapor deposition. In this case the temperature of the base was 250° C., and curling of the tape or the like was not observed. Static friction coefficient of the tape after such vapor deposition was determined according to ASTM D-1984 and was 0.55, and the tape presented good sliding properties. Coersive force after vapor deposition was 900 Oe, as determined from a magnetizing characteristic curve using a vibration sample magnetometer VSM. The results are shown in Table 2.

EXAMPLE 7

One side of the film of Reference Example 3 (1) was corona treated and coated with magnetic coating composition. The constitution of this magnetic coating composition was as follows: barium ferrite magnetic powder, 100 parts by weight; vinyl chloride—vinyl acetate copolymer (VAGH manufactured by U.C.C.), 15 parts by weight; polyurethane, 20 parts by weight; lecitin, 4 parts by weight; stearic acid, 3 parts by weight; methyl isobutyl ketone, 100 parts by weight; methyl ethyl ketone, 100 parts by weight; cyclohexanone, 100 parts by weight; and isocyanate, 3 parts by weight.

Thickness of the magnetic layer after drying was 3 μm. This magnetic tape was examined in the same manner as in Example 6. The results are shown in Table 2.

EXAMPLE 8

The procedure of Example 6 was repeated, except that both sides of the film of Reference Example 3 (2) were corona treated and magnetic materials were coated thereon, and the film was formed into a disc. The results are shown in Table 2.

EXAMPLE 9

The one side of the film of Reference Example 3 (3) was corona treated and on which a 0.8 μm thick Co—O membrane (0.21 wt %) was formed. During the formation of this membrane, electron beam was used for evaporation of Co, $O_2$ gas was introduced and separation speed was about 900Å/sec. $O_2$ composition in the membrane was analyzed using EPMA. The vapor-deposited tape was investigated in the same manner as that in Example 6. The results are shown in Table 2.

EXAMPLE 10

The procedure of Example 9 was repeated, except that Co—Ni—O membrane (0.22 wt %) was formed using CoNi (Ni, 0.1 wt %). The results are shown in Table 2.

COMPARATIVE EXAMPLE 5

The procedure of Example 6 was repeated, except that a film of Reference Example 3 (5) was used and temperature of the base was set at 100° C. The results are shown in the table. Formation of a magnetic layer at the base temperature of 250° C. was difficult due to shrinkage and curling of the film. The results are shown in Table 2.

COMPARATIVE EXAMPLE 6

The procedure of Example 6 was repeated, except that a film of Reference Example 3 (6) was used. The results are shown in Table 2.

COMPARATIVE EXAMPLE 4

The procedure of Example 6 was repeated, wherein PET film (Tetron NS 12 μm, manufactured by Teijin) was used and the temperature of the base was 200° C. The results are shown in the table. Formation of the magnetic layer at temperature of the base of 250° C. was difficult because film was partly melted, stretched or the like. The results are shown in Table 2.

TABLE 2

| No. | Production Process No. | Stretched Film of styrene Polymer | | | | |
|---|---|---|---|---|---|---|
| | | Thickness (μm) | Linear Expansion Coefficient[1] (°C.$^{-1}$) | Surface Roughness Re[2] (μm) | Static Friction Coefficient[3] | Heart Deformation Temperature (°C.) |
| Example 6 | Ref. Ex. 3(1) | 12 | $3 \times 10^{-5}$ | 0.013 | 0.54 | 255 |
| Example 7 | Ref. Ex. 3(1) | 12 | $3 \times 10^{-5}$ | 0.013 | 0.54 | 255 |
| Example 8 | Ref. Ex. 3(2) | 75 | $4 \times 10^{-5}$ | 0.014 | 0.49 | 257 |

TABLE 2-continued

| | | | | | | |
|---|---|---|---|---|---|---|
| Example 9 | Ref. Ex. 3(3) | 12 | $2 \times 10^{-5}$ | 0.008/0.014 | 0.58 | 253 |
| Example 10 | Ref. Ex. 3(4) | 12 | $2 \times 10^{-5}$ | 0.006/0.022 | 0.39 | 254 |
| Com. Ex. 5 | Ref. Ex. 3(5) | 12 | $1 \times 10^{-4}$ | 0.014 | 0.53 | 110 |
| Com. Ex. 6 | Ref. Ex. 3(6) | 12 | $2 \times 10^{-5}$ | 0.005 | 1.12 | 254 |
| Com. Ex. 7 | PET | 12 | $2 \times 10^{-5}$ | 0.02 | 0.45 | 230 |

| | Magnetic Recording Medium | | | | |
|---|---|---|---|---|---|
| No. | Magnetic Material | Thickness of Magnetic Layer (μm) | Shape | Sliding Properties[4] | Coersive Force Hc[5] (Oe) | Conditions after metallizing *6 |
| Example 6 | CO—CR | 0.1 | Tape | Good | 900 | Good |
| Example 7 | BaO—Fe$_2$O$_3$ | 3 | Tape | Good | 720 | Good |
| Example 8 | Co—Cr | 0.1 | Disk | Good | 910 | Good |
| Example 9 | Co—O | 0.8 | Tape | Good | 1,100 | Good |
| Example 10 | Co—Ni—O | 0.8 | Tape | Good | 800 | Good |
| Com. Ex. 5 | Co—Cr | 0.1 | Tape | Good | 420 | Bad |
| Com. Ex. 6 | Co—Cr | 0.1 | Tape | Bad | 880 | — |
| Com. Ex. 7 | Co—Cr | 0.1 | Tape | Good | 620 | Bad |

[1] Measured at 0 to 90° C.
[2] According to JIS B-0601, cut-off: 0.08 mm
[3] According to ASTM D-1984
[4] Static friction coefficient: 0.03–1.0: good, ≧1: bad
[5] Determined from magnetization characteristic curve by vibration sample type magnetometer VSM
*6: with curling: bad, without curling: good

REFERENCE EXAMPLE 4

(Production of Stretched Film of Styrene Polymer)

(1) The material for molding obtained in the same manner as that in Reference Example 1 (1) was used and melt extruded by a serial tandem type extruder with a T-die at the tip thereof at 330° C. Shear stress was $1.5 \times 10^5$ dyne/cm$^2$. The melt extruded sheet was contacted onto a cooling roller at 70° C. by electrostatic application to cool and solidify. In this step, the cooling rate was 60° C./sec in an average and 110 μm thick sheet for stretching was obtained. This sheet was stretched between rollers in MD (by three times) at 110° C. and stretching rate of 6,000%/min while circumferential speed of each roller was changed. Subsequently, the sheet was stretched in TD by three times at 120° C. and stretching rate of 6,000%/min. Further, the sheet was re-stretched in Md at 130° C. and 2,000%/min by 1.5 times while fixed in TD using a tenter. This film was fixed on a tenter, slightly relaxed and heat treated at 255° C. for 10 seconds.

Thickness of the film thus obtained was 8 μm. Elastic moduli of the film in MD and TD at room temperature and elastic modulus in MD at 90° C. were measured. Linear expansion coefficient of the film at 0° C. to 90° C. was measured by thermal mechanical analysis. Moreover, surface roughness was measured according to JIS B-0601 (cut-off: 0.08 mm), and static friction coefficient was measured according to ASTM D-1984B. The properties of the resulting film are shown in Table 3.

(2) The procedure of Reference Example 4 (1) was repeated, except that stretching ratio of the film in MD and in TD was increased by 3.5 times and 2.7 times, respectively. The properties of the resulting film are shown in Table 3.

(3) The procedure of Reference Example 4 (1) was repeated, except that the crystallized pellets of styrene polymers of Reference Example 1 (1) and (2) were melt coextruded by an extruder with a T-die at the tip thereof at 330° C. The properties of the resulting film are shown in Table 3. In this case, pellets of styrene polymers of Reference Example 1 (2) and (1) were melt-extruded by a serial tandem type uniaxial extruder with a main extruder containing 50/150/400/150/50 mesh and a double extruder, respectively.

(4) The procedure of Reference Example 4 (1) was repeated, except that pellet of styrene polymer of Reference Example 1 (2) was used and 50/150/400/150/50 mesh was placed in an extruder. The film was corona treated. Subsequently, a 0.5 wt % solution of styrene having a syndiotactic configuration—divinyl benzene copolymer obtained in Example 1 of Japanese Patent Application Laid-Open Publication No. 95113/1989 (wherein divinyl benzene unit, 9.4 mol %; ethyl benzene unit, 5.0 mol %; weight average molecular weight, 360,000) in chloroform was prepared. Dry method silica (Aerogil TT-600 (diameter of primary particle, 40 μm) manufactured by Degussa) (0.5 wt % based on styrene—divinyl benzene copolymer) was added to the above solution and mixed homogeneously in a cylindrical container using a homomixer type L (manufactured by Tokushukika Kogyo) to prepare a slurry solution. The slurring solution was coated on the above film using a bar coater, and dried at 250° C. for 10 seconds. The properties of the resulting film are shown in Table 3.

(5) The procedure of Reference Example 4 (1) was repeated, except that the stretching ratio in MD and that in TD were doubled and restretching was not carried out. The properties of the resulting film are shown in Table 3.

(6) The procedure of Reference Example 4 (1) was repeated, except that the stretching ratio in MD was increased by 4 times and restretching was not carried out. The properties of the resulting film are shown in Table 3.

(7) The procedure of Reference Example 4 (1) was repeated, except that the stretching ratio in MD and that in TD were increased by 4 times and twice, respectively and restretching was not carried out.

The properties of the resulting film are shown in Table 3.

(8) The procedure of Reference Example 4 (1) was repeated, except that heat-treatment was not carried out. The properties of the resulting film are shown in Table 3.

(9) The procedure of Reference Example 1 (1) was repeated, except that 4 μm silica (Silton AMT-40 manufactured by Mizusawa Kagaku Kogyo) was used to prepare a styrene polymer, and subsequent operation was carried out in the same manner as that in Reference Example 4 (2). The properties of the resulting film are shown in Table 3.

EXAMPLE 11

Corona treatment was carried out on one side of the base film obtained in Reference Example 4 (1). Subsequently, a target comprising 80 wt % Co and 20 wt % Ni was prepared, and a Co—Ni magnetic thin layer about 3,000Å thick was formed using this target by RF sputter method.

The distance between the target and the film was 60 mm, plate voltage was 1.9 kV, plate current was 160 mA and argon pressure was $1.1 \times 10^{-2}$ mmHg.

The tape was carefully slitted to the same width as that of audio tape. The commercially available cassette tape was dismantled, only tape was replaced and audio cassette was prepared.

Sliding properties of this tape were evaluated by static friction coefficient according to ASTM D-1984, which showed a good result of 0.55. This tape was recorded and set in a car stereo, then the tape was repeatedly played back for 2 hours while the cab temperature was maintained at 90° C., and change in musical intervals was checked. As the result, the tape was good, showing little change. Further, after this tape was heated an cooled between room temperature and 90° C. at the rate of 10 ° C./min under load of 6 kg/cm$^2$, displacement as measured by thermal mechanical analysis (TMA) was good, i.e. lower than 0.1%. The results are shown in Table 3.

EXAMPLE 12

One side of the base film obtained in the same manner as that in Reference Example 4 (1) was corona treated and coated with magnetic coating composition. The constitution of this magnetic coating composition was as follows: γ-FeO$_3$ magnetic powder, 45 parts by weight; vinyl chloride—vinyl acetate copolymer (VAGH manufactured by U.C.C.), 17 parts by weight; acrylonitrile—butadiene copolymer (N 1432 J manufactured by Nippon Zeon), 3.5 parts by weight; polyisocyanate (coronate L manufactured by Nippon polyurethane), 1.5 parts by weight, methyl isobutyl ketone, 50 parts by weight; toluene, 50 parts by weight and carbon black, 4 parts by weight. Thickness of the magnetic layer after drying was 3 μm.

The procedure of Example 11 was repeated using this tape. The results are shown in Table 3.

EXAMPLE 13

After corona discharge treatment was carried out on one side of the film obtained in Reference Example 4 (2), 0.1 μm thick Co—Cr membrane (Cr, 20 wt %) was formed on the side. In this step, temperature of the base was 250° C. The results are shown in Table 3.

EXAMPLE 14

The side of smooth surface of the film of Reference Example 4 (3) was corona treated and a magnetic coating composition was applied on the surface.

The constitution of this magnetic coating composition was as follows: barium ferrite magnetic powder, 100 parts by weight; vinyl chloride—vinyl acetate copolymer (VAGH manufactured by U.C.C.), 15 parts by weight; polyurethane, 20 parts by weight; lecitin, 4 parts by weight; stearic acid, parts by weight; methyl isobutyl ketone, 100 parts by weight; methyl ethyl ketone, 100 parts by weight; cyclohexanone, 100 parts by weight; and isocyanate, 3 parts by weight. Thickness of the magnetic layer after drying was 3 μm. This tape was investigated in the same manner as that in Example 11. The results are shown in Table 3.

EXAMPLE 15

The procedure of Example 11 was repeated, except that a magnetic layer was formed on the side of smooth surface of the film obtained in Reference Example 4 (4). The results are shown in Table 3.

COMPARATIVE EXAMPLE 8

The procedure of Example 11 was repeated using the film obtained in Reference Example 4 (5). The results are shown in Table 3.

COMPARATIVE EXAMPLE 9

The procedure of Example 11 was repeated using the film obtained in the same manner as that in Reference Example 4 (6). The results are shown in Table 3.

COMPARATIVE EXAMPLE 10

The procedure of Example 11 was repeated using the film obtained in Reference Example 4 (7). The results are shown in Table 3.

COMPARATIVE EXAMPLE 11

The procedure of Example 11 was repeated using the film obtained in Reference Example 4 (8). The results are shown in Table 3.

COMPARATIVE EXAMPLE 12

The procedure of Example 11 was repeated using the film obtained in Reference Example 4 (9). The results are shown in Table 3.

COMPARATIVE EXAMPLE 13

The procedure of Example 11 was repeated, except that PET film (Tetron Film, 6 μm, manufactured by Teijin) was used. The results are shown in Table 3.

TABLE 3

| | | | Stretched Film of Styrene Polymer | | | | | |
| | Production Process No. | Thickness (μm) | Elastic Modulus (kg/cm$^2$)[1] | | | | Linear[2] Expansion Coefficient (°C.$^{-1}$) | Surface Roughness Ra[3] (μm) |
| No. | | | MD (RT) | MD (90) | TD (RT) | MD/TD | | |
| --- | --- | --- | --- | --- | --- | --- | --- | --- |
| Example 11 | Ref. Ex. 4(1) | 8 | 45,000 | 42,000 | 35,000 | 1.29 | $3 \times 10^{-5}$ | 0.013 |

TABLE 3-continued

| | | | | | | | | |
|---|---|---|---|---|---|---|---|---|
| Example 12 | Ref. Ex. 4(1) | 8 | 45,000 | 42,000 | 35,000 | 1.29 | $3 \times 10^{-5}$ | 0.013 |
| Example 13 | Ref. Ex. 4(2) | 12 | 34,000 | 32,000 | 40,000 | 0.85 | $4 \times 10^{-5}$ | 0.014 |
| Example 14 | Ref. Ex. 4(3) | 8 | 44,000 | 42,000 | 36,000 | 1.22 | $2 \times 10^{-5}$ | 0.008/0.014 |
| Example 15 | Ref. Ex. 4(4) | 9 | 42,000 | 40,000 | 34,000 | 1.23 | $2 \times 10^{-5}$ | 0.006/0.022 |
| Com. Ex. 8 | Ref. Ex. 4(5) | 8 | 29,000 | 28,000 | 29,000 | 1.0 | $4 \times 10^{-5}$ | 0.011 |
| Com. Ex. 9 | Ref. Ex. 4(6) | 8 | 50,000 | 47,000 | 27,000 | 1.85 | $3 \times 10^{-5}$ | 0.023 |
| Com. Ex. 10 | Ref. Ex. 4(7) | 8 | 32,000 | 30,000 | 45,000 | 0.71 | $2 \times 10^{-5}$ | 0.017 |
| Com. Ex. 11 | Ref. Ex. 4(8) | 8 | 44,000 | 42,000 | 33,000 | 1.33 | $1 \times 10^{-4}$ | 0.014 |
| Com. Ex. 12 | Ref. Ex. 4(9) | 8 | 46,000 | 45,000 | 34,000 | 1.35 | $3 \times 10^{-5}$ | 0.056 |
| Com. Ex. 13 | PET | 6 | 46,000 | — | 49,000 | 0.93 | $2 \times 10^{-5}$ | 0.02 |

| | | Magnetic Recording Medium | | | |
|---|---|---|---|---|---|
| No. | Magnetic Material | Thickness of Magnetic Layer ($\mu$m) | Sliding Properties[4] | Recording and Reproduction[5] | Elongation of Tape |
| Example 11 | Co—Ni | 0.3 | Good | Good | Good |
| Example 12 | $\gamma$-Fe$_2$O$_3$ | 3 | Good | Good | Good |
| Example 13 | Co—Cr | 0.1 | Good | Good | Good |
| Example 14 | BaO—Fe$_2$O$_3$ | 3 | Good | Good | Good |
| Example 15 | Co—Ni | 0.3 | Good | Good | Good |
| Com. Ex. 8 | Co—Ni | 0.3 | Good | Bad | Bad |
| Com. Ex. 9 | Co—Ni | 0.3 | Good | Bad | Good |
| Com. Ex. 10 | Co—Ni | 0.3 | Good | Bad | Good |
| Com. Ex. 11 | Co—Ni | 0.3 | Good | Bad | Bad |
| Com. Ex. 12 | Co—Ni | 0.3 | Good | Bad | Good |
| Com. Ex. 13 | Co—Ni | 0.3 | Good | Bad | Bad |

[1] (RT) means room temperature and (90) means 90° C.
[2] Measured at 0 to 90° C.
[3] According to JIS B-0601, cut-off: 0.08 mm
[4] According to ASTM D-1984 Static friction coefficient: 0.03–1.0: good, ≧1: bad
[5] Sound recorded the tape was reproduced and observed in a car at 90° C. for 2 hours.
Good: without disturbance of musical interval
Bad: with disturbance in musical disturbance
[6] Displacement after heating and cooling between room temperature and 90° C. at a rate of 10° C./min. under load of 6 kg/cm$^2$ was measured by thermal mechanical analysis (TMA)
Good: displacement less than 0.1%
Bad: displacement not less than 0.1%

REFERENCE EXAMPLE 5

(Production of Stretched Film of Styrene Polymer)

(1) The material for molding obtained in the same manner as that in Reference Example 1 (1) was used and melt-extruded by a serial tandem type extruder with a T-die at the tip thereof at 330° C. Shear stress was $1.5 \times 10^5$ dyne/cm$^2$. The melt extruded sheet was contacted onto a metal cooling roller at 63° C. by electrostatic application to cool and solidify. In this step, the cooling rate was 70 ° C./sec on an average and 1,500 $\mu$m thick sheet for stretching was obtained. This sheet was stretched between rollers in MD by three times at 110° C. and stretching rate of 6,000%/min while circumferential speed of each roller was changed. Absolute value of birefringence |$\Delta$n| was $35 \times 10^{-3}$.

Subsequently, the sheet was stretched by three times in TD at 120° C. and stretching rate of 6,000%/min using a tenter. Further, the sheet was re-stretched simultaneously in MD and TD (1.5 times, each) at 130° C. and 2,000%/min while fixed in TD using a tenter. This film was fixed on a tenter, slightly relaxed and heat treated at 255° C. for 10 seconds.

Thickness of the film thus obtained was 75 $\mu$m. Absolute value of birefringence |$\Delta$n| was $14 \times 10^{-3}$. Linear expansion coefficient of the film at 0° C. to 90° C. was measured by thermal mechanical analysis. Moreover, surfaces roughness was measured according to JIS B-0601 (cut-off: 0.08 mm). The properties of the resulting film are shown in Table 4.

(2) The procedure in Reference Example 5 (1) was repeated, except that pellets of crystallized styrene polymers of Reference Example 1 (1) and (2) were used and melt-coextruded at 330° C. by an extruder with a T-die at the tip thereof into three layers of two kinds of polymers. The properties of the resulting film are shown in Table 4. In this case, the pellets of styrene polymers of Reference Example 1 (2) and (1) were melt-extruded by a serial tandem type uniaxial extruder with a main extruder containing 50/150/400/150/50 mesh and a double extruder, respectively, to give a constitution of polymer of Reference Example 1 (1)/polymer of Reference Example 1 (2)/polymer of Reference Example 1 (1). Absolute value of birefringence |$\Delta$n| of this film was $10 \times 10^{-3}$.

(3) The procedure in Reference Example 5 (1) was repeated, except that pellet of styrene polymer of Reference Example 1 (2) was used and 50/150/400/150/50 mesh was placed in an extruder. Absolute value of birefringence |$\Delta$n| of this film was $9 \times 10^{-3}$. The both sides of the film were corona treated.

Subsequently, a 0.5 wt % solution of styrene having a syndiotactic configuration—divinyl benzene copolymer obtained in Example 1 of Japanese Patent Application Laid-Open Publication No. 95113/1989 (wherein divinyl benzene unit, 9.4 mol %; ethyl benzene unit, 5.0 mol %; weight average molecular weight, 360,000) in chloroform was prepared. Dry method silica (Aerogil TT-600 (diameter of primary particle, 40 $\mu$m) manufactured by Degussa Co.) (0.5 wt % based on styrene —divinyl benzene copolymer) was added to the above solution and homogeneously mixed in a cylindrical container using a homomixer type L (manufactured by Tokushukika Kogyo) to prepare a slurry solution. The slurry solution was coated on the both sides of the above film using a bar coater, and dried at 250° C. for 10 seconds. The properties of the resulting film are shown in Table 4.

(4) The procedure in Reference Example 5 (1) was repeated, except that heat treatment was not carried out. Absolute value of birefringence $|\Delta n|$ of this film was $18 \times 10^{-3}$. The properties of the resulting film are shown in Table 4.

(5) The procedure in Reference Example 5 (1) was repeated, except that re-stretching ratio in MD was changed to 2. Absolute value of birefringence $|\Delta n|$ of this film was $53 \times 10^{-3}$. The properties of the resulting film are shown in Table 4.

(6) The procedure in Reference Example 1 (1) was repeated, except that the inorganic filler used was silica having an average diameter of 4 μm (Silton AMT-40 manufactured by Mizusawa Kagaku Kogyo), and after a styrene polymer was prepared, the procedure in Reference Example 5 (1) was repeated. Absolute value of birefringence $|\Delta n|$ of this film was $8 \times 10^{-3}$. The properties of the resulting film are shown in Table 4.

EXAMPLE 16

Both sides of the base film obtained in the same manner as that in Reference Example 2 (1) were corona treated and coated with magnetic coating composition. The constitution of this magnetic coating composition was as follows: $\gamma$-$Fe_2O_3$ magnetic powder, 45 parts by weight; vinyl chloride—vinyl acetate copolymer (VAGH manufactured by U.C.C.), 17 parts by weight; acrylonitrile—butadiene copolymer (N 1432 J manufactured by Nippon Zeon), 3,5 parts by weight; polyisocyanate (coronate L manufactured by Nippon polyurethane), 1.5 parts by weight, methyl isobutyl ketone, 50 parts by weight; toluene, 50 parts by weight and carbon black, 4 parts by weight. Thickness of the magnetic layer after drying was 3 μm.

Subsequently, the both sides of this film were properly polished, then cut into the same size as the commercially available floppy (5-inch). Further, this disk was enclosed in a Jacket of the commercially available floppy disk to prepare a floppy disk. A program was fed to this floppy using NEC PC-9801F. Then, the floppy was left at 80° C. under 70% RH (relative humidity) for 50 hours. After the floppy was brought to the normal condition and LOAD and RUN of the program were carried out. The conditions were good. This fact showed that dimensional changes in all directions under high temperature and high humidity conditions were very small and well balanced. LOAD and RUN were continuously repeated ($\times 100$), resulting in no special abnormality but good sliding properties and good performance traverse. The results are shown in Table 4.

EXAMPLE 17

Corona treatment was carried out on both sides of the base film obtained in the same manner as that in Reference Example 5 (1). Subsequently, a target comprising 80 wt % Co and 20 wt % Ni was prepared. and a Co—Ni magnetic thin films of about 3,000Å thickness were formed on both sides using this target by RF sputter method, which was subjected to anodic oxidation in a solution containing an electrolyte to form passive state membrane on the surface. As condition for sputtering, the distance between the target and the film was 60 mm, plate voltage was 1.9 kV, plate current was 160 mA and argon pressure was $1.1 \times 10^{-2}$ mmHg.

The procedure in Example 16 was repeated using this film. The results are shown in Table 4.

EXAMPLE 18

The procedure in Example 16 was repeated, except that the film obtained in Reference Example 5 (1) was used. The results are shown in Table 4.

EXAMPLE 19

The procedure in Example 16 was repeated, except that the film obtained in Reference Example 5 (3) was used. The results are shown in Table 4.

COMPARATIVE EXAMPLE 14

The procedure in Example 16 was repeated, except that the film obtained in Reference Example 5 (4) was used. The results are shown in Table 4.

COMPARATIVE EXAMPLE 15

The procedure in Example 16 was repeated, except that the film obtained in Reference Example 5 (5) was used. The results are shown in Table 4.

COMPARATIVE EXAMPLE 16

The procedure in Example 16 was repeated, except that the film obtained in Reference Example 5 (6) was used. The results are shown in Table 4.

COMPARATIVE EXAMPLE 17

The procedure in Example 16 was repeated, except that polyethylene terephthalate (PET) film (Tetron V, 75 μm, manufactured by Teijin) was used. The results are shown in Table 4.

TABLE 4

| | Stretched Film of Styrene Polymer | | | | | |
|---|---|---|---|---|---|---|
| | Production | | Linear Expansion Coefficient | | | Surface |
| No. | Process No. | Thickness (μm) | MD (°C.$^{-1}$) | TD (°C.$^{-1}$) | MD/TD | Roughness Ra[1] (μm) |
| Example 16 | Ref. Ex. 5(1) | 80 | $3.2 \times 10^{-5}$ | $2.1 \times 10^{-5}$ | 1.5 | 0.013 |
| Example 17 | Ref. Ex. 5(1) | 80 | $3.2 \times 10^{-5}$ | $2.1 \times 10^{-5}$ | 1.5 | 0.013 |
| Example 18 | Ref. Ex. 5(2) | 80 | $2.4 \times 10^{-5}$ | $1.8 \times 10^{-5}$ | 1.3 | 0.015 |
| Example 19 | Ref. Ex. 5(3) | 80 | $1.8 \times 10^{-5}$ | $1.5 \times 10^{-5}$ | 1.2 | 0.022 |
| Com. Ex. 14 | Ref. Ex. 5(4) | 80 | $10.3 \times 10^{-5}$ | $5.6 \times 10^{-5}$ | 1.8 | 0.014 |
| Com. Ex. 15 | Ref. Ex. 5(5) | 85 | $1.8 \times 10^{-5}$ | $6.8 \times 10^{-5}$ | 3.8 | 0.019 |
| Com. Ex. 16 | Ref. Ex. 5(6) | 80 | $3.4 \times 10^{-5}$ | $2.8 \times 10^{-5}$ | 1.2 | 0.056 |
| Com. Ex. 17 | PET | 75 | $2.5 \times 10^{-5}$ | $2.2 \times 10^{-5}$ | 1.1 | 0.02 |

| | Magnetic Disk | | | | |
|---|---|---|---|---|---|
| No. | Magnetic Material | Thickness of Magnetic Layer (μm) | Sliding Properties Running Properties[2] | Reliability Dimensional Change[3] | Reproduction Conditions |
| Example 16 | $\gamma$-$Fe_2O_3$ | 3 | Good | Good | Good |
| Example 17 | Co—Ni | 0.3 | Good | Good | Good |
| Example 18 | $\gamma$-$Fe_2O_3$ | 3 | Good | Good | Good |

TABLE 4-continued

| | | | | | |
|---|---|---|---|---|---|
| Example 19 | γ-Fe₂O₃ | 3 | Good | Good | Good |
| Com. Ex. 14 | γ-Fe₂O₃ | 3 | Good | Bad | Bad |
| Com. Ex. 15 | γ-Fe₂O₃ | 3 | Good | Bad | Bad |
| Com. Ex. 16 | γ-Fe₂O₃ | 3 | Good | Good | Bad |
| Com. Ex. 17 | γ-Fe₂O₃ | 3 | Good | Bad | Bad |

[1] According to JIS B-0601, cut-off: 0.08 mm
[2] Condition after repeated usage (× 100)
Good.: LOAD can be readily conducted.
Bad: Needed to re-set in disk drive system at least twice
[3] After 50 hours at 80° C., 70% RH
Dimensional stability:
Good: with < 0.1% deformation in any direction
Bad: with ≥ 0.1° deformation in either direction
Reproduction
Good: LOAD of program was good
Bad: LOAD of program was bad

EXAMPLE 20

Based on 100 parts by weight of the styrene polymer obtained in Reference Example 1 (1) which had been sufficiently dried under reduced pressure, 0.03 parts by weight of fluorescent whitening agent (OB-1, manufactured by Eastmann) and 12 parts by weight of fine-grain calcium carbonate (average particle diameter, 0.9 μm; natural product, surface treated with stearic acid) were mixed using a super mixer for a minute, then extruded by a biaxial extruder with capillary die at the tip thereof and cut into pellet.

This pellet was stirred in a dry hot air at 120° C. This pellet was extruded at 320° C. by a uniaxial extruder with a T-die at the tip thereof. The extruded molten sheet was taken up via cooling metal rollers of touch roll type. The temperature of the metallic rollers was 70° C. and the average cooling rate was about 50 ° C./sec. The resulting 1,000 μm thick pre-molded product was stretched between nip rolls with different circumferential speeds by 3 times while heated at 115° C. The stretching rate was 6,000%/min. Subsequently, this film was stretched by 3 times at 120° C. and 3,000%/min. using a tenter, then heat treated at 250° C. for 20 seconds under a state of tension.

Thickness of the film thus obtained was 120 μm. Witness measured according to JIS L-1074 was 85. Linear expansion coefficient of the film at 0° C. to 90° C. as measured by thermal mechanical analysis was $5 \times 10^{-5}$ ° C., and heat shrinkage after 30 minutes at 200° C. was 0.5%. Elastic modulus was 45,000 kg/cm².

One side of the base film thus obtained was corona treated and coated with magnetic coating composition. The constitution of this magnetic coating composition was as follows: γ-Fe₃O₃ magnetic powder, 45 parts by weight; vinyl chloride—vinyl acetate copolymer (VAGH manufactured by U.C.C.), 17 parts by weight; acrylonitrile—butadiene copolymer (N 1432 J manufactured by Nippon Zeon), 3.5 parts by weight; polyisocyanate (coronate L manufactured by Nippon polyurethane), 1.5 parts by weight, methyl isobutyl ketone, 50 parts by weight; toluene, 50 parts by weight and carbon black, 4 parts by weight. Thickness of the magnetic layer after drying was 3 μm.

Picture was printed on the opposite side to the magnetic layer and input and output of the information was attempted, providing good result. The surface did not glare, and the printed surface was presented vivid and preferable appearance. The card had sufficient resiliency and its appearance and performance were not affected by temperature change from 0° to 100° C. The results are shown in Table 5.

EXAMPLE 21

The procedure in Example 20 was repeated, except that 42 parts by weight of titanium oxide (tipake A-100; an average particle diameter, 0.2 μm) was used as white inorganic filler and a magnetic card was obtained. Elastic modulus of this card was 52,000 kg/cm². The results re shown in Table 5.

COMPARATIVE EXAMPLE 18

The procedure in Example 20 was repeated, except tht white inorganic filler was not used. The resulting magnetic card had same performance as that of Example 20, but inferior in sliding properties. That is, after repeated usage, printed image was partially peeled off. The appearance glared, and the card was sticky, providing bad touch. That is, the appearance was not preferable. The results are shown in Table 5.

COMPARATIVE EXAMPLE 19

The procedure in Example 20 was repeated by including 70% by weight of white inorganic filler. As the result, the base film was not obtained because it was broken during stretching.

COMPARATIVE EXAMPLE 20

A 100 μm thick vinyl chloride film containing 30% by weight of TiO₂ was obtained. The procedure in Example 20 was repeated using this film. The resulting magnetic card had insufficient heat resistance and dimensional stability. The results are shown in Table 5.

COMPARATIVE EXAMPLE 21

The procedure in Example 20 was repeated, except that polyethylene terephthalate having intrinsic viscosity of 0.61 (measured in o-chlorophenol solution at 35° C.) was used. The resulting magnetic card had low heat resistance and bad appearance, and particularly the surface glared, which was not preferred from the viewpoint of appearance. Elastic modulus of this card was 40,000 kg/cm². The results are shown in Table 5.

TABLE 5

| No. | Resin[1] | Inorganic Filler | Content (wt %) | Linear[2] Expansion Coefficient | Whiteness[3] | Dimensional Stability to Heat | Appearance[5] | Resilience[6] |
|---|---|---|---|---|---|---|---|---|
| Example 20 | SPS | Calcium carbonate | 11 | $5 \times 10^{-5}$ | 84 | Good | Good | Good |

TABLE 5-continued

| No. | Resin[1] | Inorganic Filler | Content (wt %) | Linear[2] Expansion Coefficient | White-ness[3] | Dimensional Stability to Heat | Appearance[5] | Resilience[6] |
|---|---|---|---|---|---|---|---|---|
| Example 21 | SPS | Titanium oxide | 30 | $5 \times 10^{-5}$ | 87 | Good | Good | Good |
| Com. Ex. 18 | SPS | — | — | $3 \times 10^{-5}$ | — | Good | Bad | Good |
| Com. Ex. 20 | Polyvinyl chloride | Titanium oxide | 30 | — | 86 | Bad | Good | Bad |
| Com. Ex. 21 | PET | Calcium carbonate | 11 | $6 \times 10^{-5}$ | 82 | fair | Bad | Good |

[1]SPS: Polystyrene having a syndiotactic configuration
PET: Polyethylene terephthalate
[2]measured at 0 to 90° C. by thermal mechanical analysis
[3]measured according to JIS L-1074
The sample of Comparative Example 1 was colorless and transparent
[4]*Heat shrinkage was measured at 200° C. for 30 minutes. within 0.5%: Good, 0.5-2%: Fair, ≧2%: Bad
[5]Good: The printed image had vivid color, and did not glare nor adhere to hand
Bad: Failed to satisfy any or all of the above requirements
[6]Compared by bending based on PET
The sample was cut into the same size as the commercially available "telephone card", and bent in U-shape, the distance between the shorter sides being 30 mm, then released, and distortion of the card was observed.
Good: warp less than 2 mm
Bad: warp over 2 mm

INDUSTRIAL AVAILABILITY

The above obtained magnetic recording medium of the present invention is excellent in sliding properties and smoothness, has high heat resistance, moisture resistance and excellent dimentional stability to temperature and moisture, and further has good coersive force and can be densified. In addition to the aforementioned characteristics, the magnetic tape of the present invention has good dimensional stability at high temperature, and can provide good reproduction free from elongation of tape upon usage at high temperature of 90° C.

In addition to the above characteristics, the magnetic disk of the present invention has flexibility and less dimensional changes under high temperature and high humidity conditions, while dimentional changes in any direction may be well balanced. Moreover, sliding properties of the surface is extremely excellent.

The magnetic card of the present invention, which has, in addition to the above characteristics, sufficient whiteness, is a resilient card with excellent appearance and durable upon usage for a long period of time.

Accordingly, the magnetic recording medium of the present invention can be suitably used widely, for example, as various kinds of magnetic tapes, magnetic disks, magnetic drums, magnetic cards, etc. Further, according to the present invention, the magnetic tape can be efficiently used as heat resistant magnetic tape which is used for on board audio apparatus such as car stereo or video; the magnetic disk as flexible magnetic disk such as floppy disk; and the magnetic card as various kinds of magnetic cards such as prepaid card, ticket, card key and the like.

We claim:

1. A heat resistant magnetic tape which comprises a magnetic layer formed on at least one side of a base film which is a stretched film consisting essentially of a styrene polymer having a syndiotactic configuration or a composition thereof or a laminate film containing said stretched film wherein elastic moduli in MD and TD at room temperature are not less than 30,000 kg/cm², the ratio (MD/TD) is not less than 0.8, elastic modulus at 90° C. in MD is not less than 10,000 kg/cm², linear expansion coefficient at 0° to 90° C. is not more than $5 \times 10^{-5}$ /° C. and surface roughness Ra is 0.001 to 0.03 μm.

2. The magnetic tape according to claim 1, which comprises a composition of styrene polymer having a syndiotactic configuration and containing inorganic filler.

3. A magnetic disk which comprises a magnetic layer formed on at least one side of a base film which is a 20 to 200 μm thick stretched film consisting essentially of a styrene polymer having a syndiotactic configuration or a composition thereof or a laminate film containing said stretched film wherein the linear expansion coefficient at 0° to 90° C. in the MD ($\alpha_{MD}$) and that in the TD ($\alpha_{TD}$) are not more than $5 \times 10^{-5}$/° C., and the ratio ($\alpha_{MD}/\alpha_{TD}$) is 0.3 to 3 and surface roughness Ra is 0.001 to 0.03 μm.

4. The magnetic disk according to claim 3, wherein the stretched film comprises a composition of a styrene polymer having a syndiotactic configuration and containing inorganic filler.

5. A magnetic card having a magnetic layer on at least one side of a base film which is a film of a composition comprising 40 to 99% by weight of a styrene polymer having a syndiotactic configuration and 60 to 1% by weight of white inorganic filler, and has a linear expansion coefficient of not more than $7 \times 10^{-5}$/° C., a whiteness of not less than 75 and a thickness of 50 to 1,000 μm.

* * * * *